Dec. 22, 1959  G. W. JACKSON ET AL  2,918,304
PNEUMATIC SUSPENSION CONTROL SYSTEM
Filed May 2, 1957  3 Sheets-Sheet 1
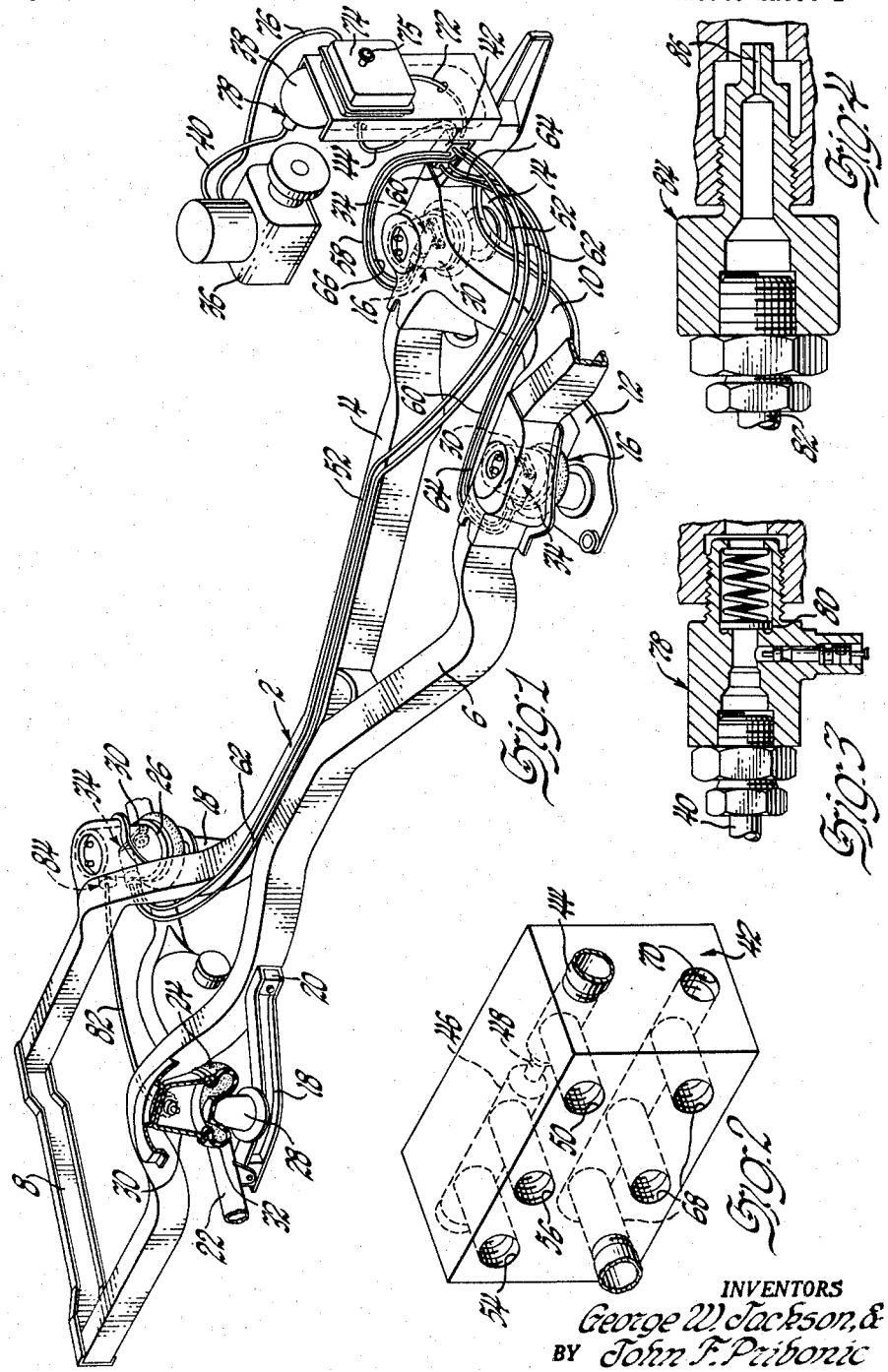
INVENTORS
George W. Jackson, &
BY John F. Pribonic
J. E. Thorpe
ATTORNEY

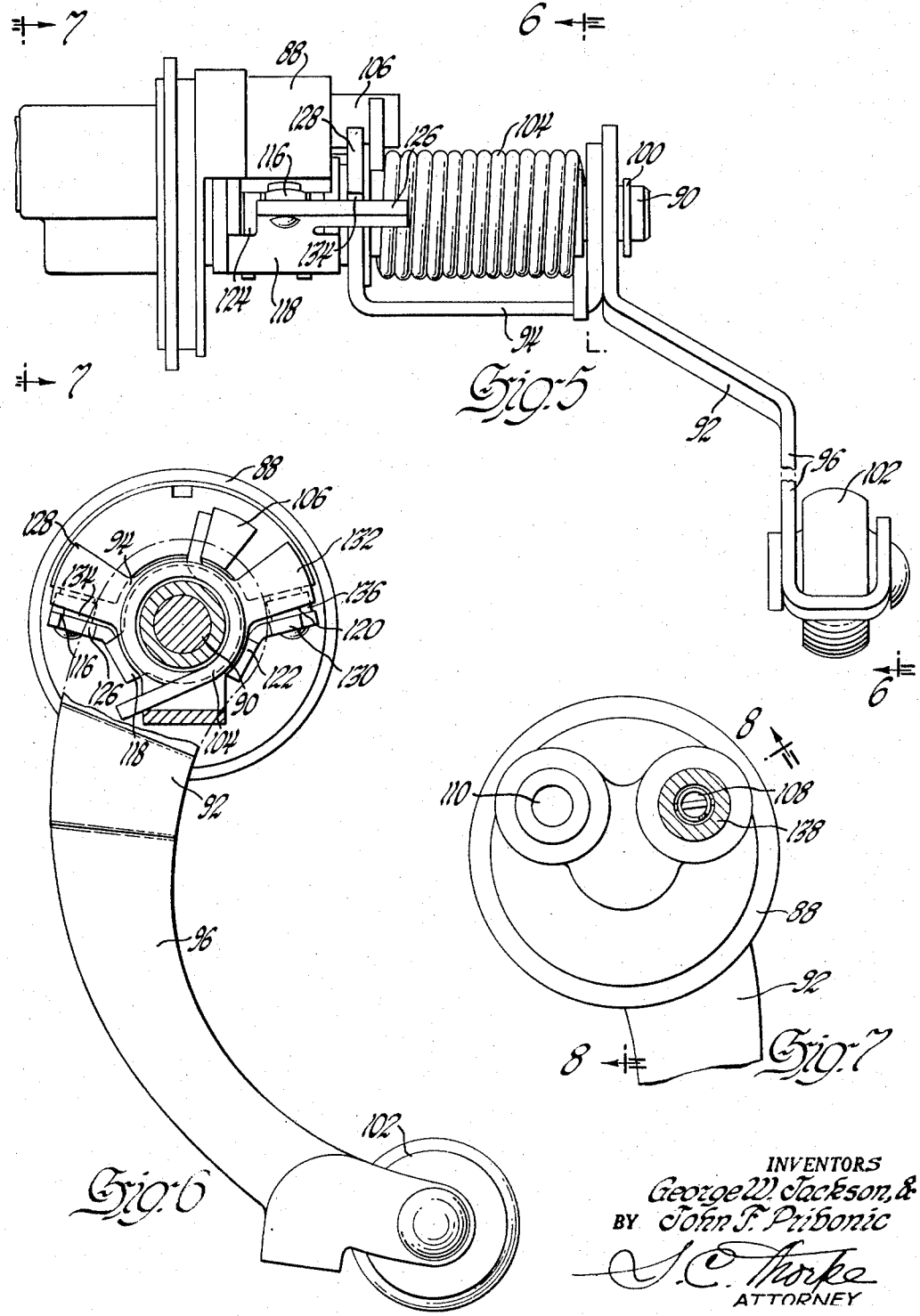

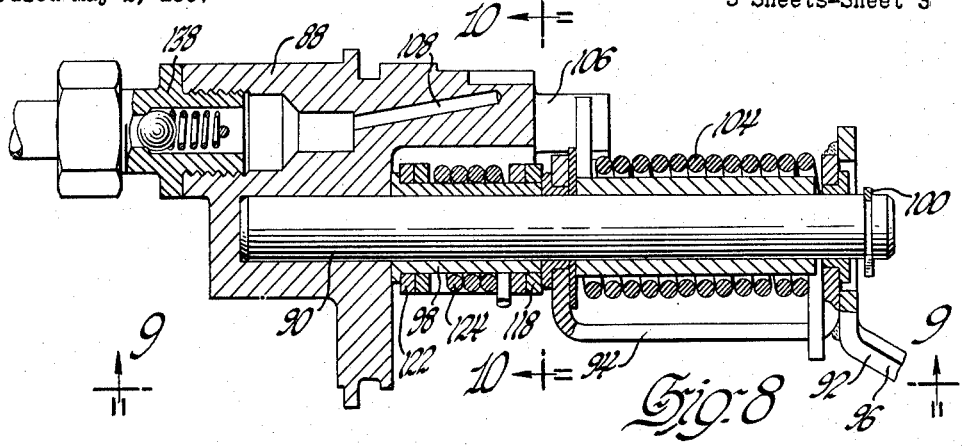
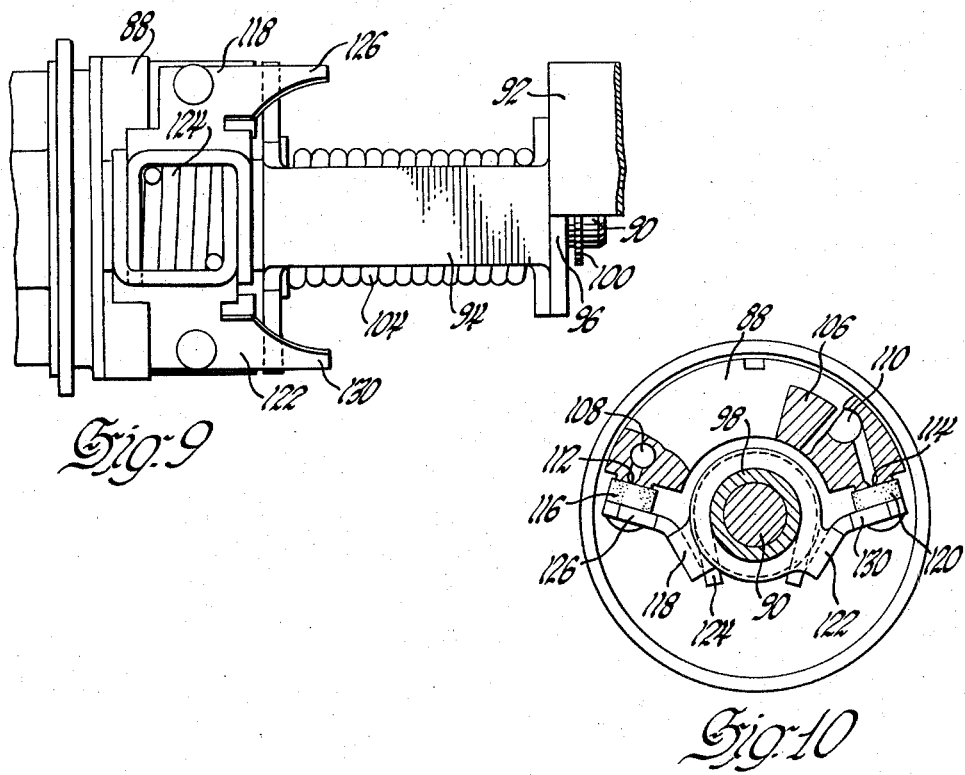

United States Patent Office 2,918,304
Patented Dec. 22, 1959

2,918,304

PNEUMATIC SUSPENSION CONTROL SYSTEM

George W. Jackson and John F. Pribonic, Dayton, Ohio, assignors to General Motors Corporation, Detroit, Mich., a corporation of Delaware Application May 2, 1957, Serial No. 656,628

5 Claims. (Cl. 280—124)

This invention relates generally to vehicle suspensions utilizing a plurality of expansible fluid reservoirs between the sprung and unsprung portions of the vehicle chassis and particularly to a system of air supply controls and restrictive connections acting in combination to control and regulate the transmittal of air between such reservoirs and an air pressure source.

As is well known in a suspension of the type with which the present invention is concerned, the amount of air in the reservoirs is regulated by so-called "leveling" valves which act in response to changes in the deflection or distance between the sprung and unsprung portions of the chassis to either connect intake ports for the reservoirs to an air pressure source if the deflection is less than a predetermined proper amount, connect exhaust ports for the reservoirs to relieve pressure therein if the deflection is too great, or else close the ports and maintain reservoir pressure when deflection is the proper amount. It will be appreciated that a primary purpose of such a suspension is to maintain the deflection relatively constant, i.e., the vehicle body the same distance at all points above the road surface regardless of the static load carried thereby or how it is distributed. However, when the vehicle is moving on a roadway dynamic forces are applied to the reservoirs which are created by road surface irregularities, curves, hills, valleys, starting and stopping, etc. These dynamic forces cause momentary changes in deflection which may result in undesirable opening of the intake and exhaust ports of the bellows by the leveling valves to erratically inflate or deflate them unnecessarily. This erratic inflation and deflation has a deleterious effect on the riding qualities obtainable with the foregoing type of fluid or air suspension. Among other things it may result in "pumping up" one or more reservoirs causing a corner or a side to ride high until the vehicle returns to a smooth or level surface. Diagonal corners may be inflated or deflated resulting in a ride having a "galloping" characteristic.

The present invention has been provided to obviate the difficulties outlined above, by the unique provision of certain amounts of lost motion in the actuating portions of the leveling valves. This "lost motion" allows a certain amount of deflection or relative movement to occur between sprung and unsprung portions, which may be caused by dynamic forces applied to the reservoirs, without actually opening the ports therein, thus maintaining the amount of air in the reservoirs constant. It will be appreciated that the amount of this lost motion must of necessity be rather small, otherwise the valve assemblies would not sufficiently respond to the amount of deflection for maintaining the proper vehicle level. For this reason, in the event the dynamic forces applied to the reservoirs are too large to be compensated for by the "lost motion" of the valve actuators the build up or exhaustion of air to or from the reservoirs caused by dynamic forces being applied thereto is damped by uniquely placed orifices located in the fluid distribution lines. These orifices or restrictions meter the air so as to slow down or deter its passage to or from the reservoirs and consequently make the air suspension system somewhat less sensitive to these dynamic forces. In addition, to prevent "pump-up" or "pump-down" of the reservoirs on a bumpy roadway, the relative sizes of the orifices in the intake and exhaust lines to and from the reservoirs are chosen with respect to each other to compensate for the difference in the pressure differentials between the air pressure source and reservoir and the reservoir and exhaust port of the exhaust line in order to maintain the volume of air flowing to the reservoirs as nearly the same as possible as the volume of air flowing from the reservoirs when the reservoir intake and exhaust valves are alternately opened and closed by the dynamic forces created by the bumpy roadway and applied through the sprung and unsprung portions of the vehicle to the reservoirs.

One further handicap encountered in previous systems of the type outlined above resides in the fact that when the leveling valves are open, for example, due to an excessive dynamic force causing enough of a change in deflection between the sprung and unsprung portions of the vehicle to cause opening of the valves, such forces and perhaps further dynamic forces may be applied which increases the air pressure in the reservoirs beyond that of the source normally supplying the reservoirs. This, unless properly compensated for, would cause pumping out of the reservoirs through the intake ports. Furthermore, should breaks occur in the air transmission lines or leaks appear in the main reservoir or accumulator tank, the inlets of the leveling valves to the reservoirs would remain open and exhaust these reservoirs removing all resiliency from the suspension, thereby rendering it inoperative. To prevent such a contingency check valves have been uniquely located in the system.

For a more complete understanding of the invention and the objects thereof, reference may be had to the following detailed description taken in conjunction with the drawings, in which:

Fig. 1 is a view in perspective of parts of an automobile chassis which includes air reservoirs between sprung and unsprung portions thereof forming elements of the unique suspension system of this invention.

Fig. 2 is a schematic or diagramatic showing in perspective of the junction box which distributes the high pressure air from the accumulator tank of the system to the air reservoirs thereof indicating the restriction therein between the feed line thereto from the accumulator tank and the supply lines to the two front reservoirs but not the supply line to the left rear reservoir.

Fig. 3 is a detailed showing of a check valve located in the connecting line between the compressor and the accumulator tank to prevent the loss of air pressure in the tank in the event of compressor shut down, failure or unloading.

Fig. 4 is a detailed showing in section of a fitting secured in the left rear reservoir to which a crossover line to the right rear reservoir is connected and which includes an orifice to meter or restrict the rate of air flow between these two reservoirs.

Fig. 5 is a side view in elevation greatly enlarged of one of the so-called "leveling" valve assemblies used to supply an exhaust air from the reservoirs in response to the changes in relative distance between sprung and unsprung portions of the vehicle chassis.

Fig. 6 is an end view of the valve assembly with parts broken away and in section taken substantially on the line 6—6 of Fig. 5, illustrating the lost motion feature of the valve actuating means and other details of the valve assembly.

Fig. 7 is a view taken essentially on the line 7—7 of

Fig. 5 and illustrates the connection fittings for the exhaust and supply lines of each of these leveling valve assemblies.

Fig. 8 is a view with parts in section and broken away taken substantially on the line 8—8 of Fig. 7 and serves to illustrate the check valve fitting used on the inlet side of the valve assembly and also the torsion spring assemblies one of which normally biases the exhaust and inlet valve carriers in opposite rotative directions, and the other of which biases the actuating lever or arm of the valve assembly in the counterclockwise direction.

Fig. 9 is a view taken essentially on the line 9—9 of Fig. 8 and illustrates the manner in which the valve carriers are provided with projections or extensions engageable by ears on a yoke secured to the valve actuator after predetermined movement, which constitutes lost motion of the lever and yoke before opening of the valves.

Fig. 10 is a view of the valve assembly with parts in section taken substantially on the line 10—10 of Fig. 8, illustrating the orifice openings which are opened and closed by the flapper valves therefor.

Referring first to Fig. 1, an automotive chassis 2 is shown which comprises a pair of side rails 4 and 6 extending generally longitudinally and secured together intermediate their ends and diverging at the ends so as to form essentially and X-frame. The rear ends of the X-frame are fixed together by a transversely extending transom member 8. The front portions of the side rails 4 and 6 are secured together by a cross frame member 10. Pivotally secured to the cross frame member 10 are lower wishbone members 12 and 14. These wishbone members which are deemed to constitute unsprung portions of the chassis each have interposed between them and the forward portions of the side rails 6 an air reservoir assembly indicated generally by the numeral 16. At the rear of the chassis lower radius rod members 18 are pivotally connected at the points 20 to the rearward portions of side rails 4 and 6 and have their opposite ends connected to the rear axle housing. Interposed between the radius rod members 18 and the rear portions of the side rails 4 and 6 are right and left air reservoir assemblies indicated generally by numerals 24 and 26, respectively, these reservoirs being similar in most respects to the reservoirs 16. Each of the air reservoirs 16, 24 and 26 includes a lower piston-like member 28 (see air reservoir assembly 24 in Fig. 1) which is fixed to an unsprung portion of the chassis and an upper can or container 30 which is secured to a sprung portion of the chassis. Around the lower edge of the containers 30 is secured the open edge of a diaphragm or bellows 32 which is fastened to and rests on the piston-like member 28 so that when the reservoirs 16, 24 and 26 are properly inflated the side rails 4 and 6 of chassis 2 are resiliently supported on the unsprung portions 12, 14 and 18, respectively. It will be observed that the rear left air reservoir assembly 26 and the front air bellows assembly 16 are each provided with a so-called "leveling" valve assembly 34. Right rear reservoir 24, however, is not provided with such a leveling valve assembly as the air is supplied thereto from the left rear reservoir 26 in a manner to be described in more detail shortly.

The vehicle is provided with a compressor 36 which may be engine driven and which in turn charges an accumulator tank 38 mounted on the chassis 2 by means of conduit line or piping 40. The accumulator tank feeds to a junction box 42 via piping or conduit 44. Schematic details of the junction box which is shown in Fig. 2 indicate that conduit 44 communicates with an upper passage 46 having a restriction 48 provided therein. A branch passage 50 leads from the passage 46 before the restriction 48 and has connected therein the piping or conduit 52 which leads from branch passage 50 of the junction box to the intake passage in the leveling valve 34 of the left rear air reservoir assembly 26. The passage 46 in junction box 42 is also provided with a pair of branch passages 54 and 56 which it will be noted are located after the restriction 48. These branch passages 54 and 56 have connected thereto lines 58 and 60 which lead to the intake passages of the leveling valve assemblies 34 of the front left and right air reservoir assemblies 16, respectively. Return or exhaust lines leading from the exhaust sides of the leveling valve assemblies 34 of the rear left air reservoir 26 and the front air reservoirs 16, which lines are identified by the numerals 62, 64 and 66, respectively, are connected to lower branch passages 68 in junction box 42. Branch passages 68 lead to exhaust passage 70 in junction box 42, which in turn communicates via conduit or piping 72 with an intake box 74 having an air make-up intake port 75 communicating with the atmosphere. The intake box 74 is connected to the compressor via piping 76.

At the end of the pipe 40 leading from the compressor to the accumulator tank 38 is a fitting indicated generally by a numeral 78 (see Fig. 1), the details of which are shown in Fig. 3. As illustrated in Fig. 3, check valve 78 has a spring biased valve 80 which allows one-way flow of air from the compressor to the accumulator tank 38 but prevents any back flow out of the accumulator tank toward the compressor 36. In this way protection is provided to prevent discharge of the accumulator tank because of compressor leakage when the compressor is shut down or in the event the compressor should fail, or for some other reason be unloading.

Referring now to the rearward portion of the chassis shown in Fig. 1, it will be observed that the rear left reservoir 26 is connected to the right rear air reservoir via piping 82 and a fitting 84 which includes a restriction or orifice, the details of which are shown in Fig. 4. In Fig. 4 it will be seen that fitting 84 has a relatively small passage 86 which prevents too rapid inter-change of air between reservoirs 24 and 26 for a purpose which will appear in more detail shortly.

Air is supplied to reservoirs 16, 24 and 26 via the aforementioned piping and restrictions and also exhausted therefrom by means of the so-called leveling valve assemblies indicated generally by the numeral 34. The details of one of these valves are shown particularly in Figs. 5 through 10. Upon reference to those figures and also Fig. 1, it will be observed that each of the so-called "leveling" valve assemblies 34 is provided with a valve body 88 (see particularly Fig. 8) which is fixed by suitable fittings into one wall of the upper can or container 30. This body 88 has pressed or otherwise fixed therein a stationary shaft 90 on which is journaled at one end thereof a valve actuator or actuating assembly 92 which includes a yoke 94 and a lever fixed to the yoke for movement therewith. One end of the yoke 94 is spaced from the valve housing 88 by means of a bushing 98 and the valve actuator is retained on the shaft by a retaining washer or ring 100.

From Figs. 1, 5 and 6 it will be observed that the lever arm 96 is located inside the air reservoirs and is provided with a roller or follower 102 on the free end thereof. This follower 102 rides on the upper end of the piston-like member 28 in reservoirs 16 and 26 and is moved thereby depending upon the movement of piston 28 relative to the can or container 30 to which the valve housing is fixed. The valve actuator 92 including the yoke 94 and the lever 96 is normally biased in a clockwise direction as viewed in Fig. 6 (see also Fig. 8) by a torsion spring 104 which has one end abutting the yoke 94 and the opposite end abutting a projection 106 on the valve housing 88.

Particularly in Fig. 10 it will be observed that the valve housing includes an intake passage 108 and an exhaust passage 110. The intake passage 108 terminates in a restricted valve port 112 whereas exhaust passage 110 terminates in a restricted port 114. Port 112 may be opened and closed by a flapper valve 116 provided on a rotating valve carrier piece 118 which is journaled on bushing 98 provided on shaft 90 (in addition to Fig. 10, see also Fig. 8). Port 114 may be opened or closed by a similar valve 120 which is supported on a rotatable carrier 122 also journaled on bushing 98. Carriers 118, 122 are normally biased to cover ports 112 and 114, respectively, by means of a torsion spring 124 about bushing 98 which tends to bias carrier 118 in a clockwise direction and carrier 122 in counterclockwise direction when viewed in Fig. 10. Particularly in Figs. 5, 6, 9 and 10 it may be seen that carrier 118 is provided with an extension or projection 126 extending parallel to the axis of shaft 90 and which is abuttable by a tab or ear 128 provided on the yoke 94 of the valve actuator 92. Similarly, carrier 122 is provided with an extension or projection which also extends parallel to the axis of shaft 90 and is abuttable by a tab or ear 132 on yoke 94 of valve actuator 92 upon predetermined rotation thereof. Especially in Fig. 6, it will be observed that between projection 126 and tab 128 there is a certain amount of spacing indicated by a numeral 134. Similarly, between ear 132 and projection 130 there is spacing 136. This spacing which constitutes a certain amount of lost motion of the valve actuator prior to opening of the intake or exhaust valves normally occurs when the distance or deflection between the sprung and unsprung portions of the vehicle are at the predetermined amount. The primary purpose of this lost motion, which will be brought out in more detail somewhat later, is to allow the valve actuator to move through a small range under the influence of road surface irregularities, etc., without inflation or deflation of the reservoirs.

The restrictive orifices or ports 112 and 114 of the valves serve to restrict the flow of air to or from the reservoirs so as to retard the loss of air therefrom or the increase of air thereto which might occur when the valves are opened by dynamic forces being applied to the air reservoirs. Since, however, there is a practical limit on how small the ports 112 can be made without danger of them becoming clogged with foreign matter in the air the restriction 48 was added to junction box 42 at the point indicated to further impede flow of air to the front reservoirs.

It should be emphasized at this point that normally in systems of this kind the pressure differentials between the original pressure source and the reservoir, and between the reservoir and the exhaust port of the exhaust lines, differ such that one pressure differential dominates the other (is larger than the other). For example, let it be assumed that the output pressure of the compressor remains relatively constant at 250 pounds per square inch, that the pressure in the air reservoirs under normal load is 90 pounds per square inch and that the pressure at the outlet sides of the exhaust lines leading to the intake tank 74 which is connected to the atmosphere at port 75 is zero. Under such conditions it will be observed that the pressure differentials causing air flow from the compressor into the air reservoirs is 160 pounds per square inch whereas the pressure differential causing the exhaustion of air from the reservoirs, i.e., the difference between the pressure of the reservoir and the atmosphere (which is taken as zero) is 90 pounds per square inch. Under such conditions if the intake ports are of the same size and are opened to the same degree for the same length of time as the exhaust passages when the vehicle suspension is subjected to irregular or bumpy road conditions, then the volume of air flowing into the reservoirs will be greater than that flowing out and will cause pump-up of the reservoirs. To compensate for this dominant pressure differential and to reduce or eliminate pump-up in the example given, the intake orifices 112 of the leveling valves would be made sufficiently smaller than the exhaust orifices 114 so that the volume of air flowing into the reservoirs when the intake valves are opened would be as close as possible to the volume of air flowing out of the air reservoirs when the exhaust valves are opened. It will be appreciated, of course, that the conditions chosen could be reversed, i.e., the dominant pressure differential could be that between the reservoir pressure and the low pressure side of the compressor in which case the orifice on the intake side of the reservoir would be made larger than the orifice on the outlet side thereof.

In Fig. 8 it will be observed that the intake passages 108 of the valve assemblies are each provided with a check valve 138 which is in the form of an assembly fitting threadable into the housing 88. Check valves 138 prevent back flow from the air reservoirs through the intake lines toward the junction box and the accumulator tank 38. This back flow might occur when the intake valves are open and dynamic loads are applied to the reservoirs which momentarily increase the pressures in these reservoirs above that in the accumulator, thus causing a "pumping out" of these reservoirs when in fact no loss of air in the reservoirs is desired. The check valves further serve the function of preventing the reservoirs from being discharged in the event of a leak in the accumulator or in the charging lines leading from the accumulator and junction box to the reservoirs when the intake valves are open.

The system of air supply controls and their restrictive connections thus acts to regulate the transmittal of air between the reservoirs and air pressure sources. The lost motion provided in the valve actuating assemblies of the valve assemblies effectively prevents any intake or loss of air from the reservoirs upon small amplitude dynamic forces being applied thereto which change the deflection between the sprung and unsprung portions of the chassis predetermined small amounts. This lost motion feature effectively combines with the restrictions provided in the system and particularly in the valve assemblies and in the junction box leading to the valve assemblies to prevent a too rapid transfer of air to and from the reservoirs when the dynamic forces are of sufficient amplitude to open the exhaust or inlet valve ports. The check valves which have been provided at the leveling valve locations further combine to assure inflation of the air reservoirs in the event of air transmission line failure, leaks in the accumulator, etc.

A further feature to be noted in this suspension system is the manner in which the rear right reservoir 24 charged or discharged. This occurs through the rear left assembly through restriction 86. By this novel arrangement the suspension comprises essentially a uniformly elevated rear suspension which is trimmed to a proper parallel level with the road surface by the leveling valves in the forward air reservoirs. The restriction in the crossover line between rear reservoirs 24 and 26 prevents a too rapid change of air between these two reservoirs which would tend to impair or affect the suspension and a rapid and accurate leveling.

It has been found that the arrangement of the two front reservoirs with individual leveling valves and the rear reservoirs with a single leveling valve and a restricted crossover line including the manner of transmitting air to and from them is particularly effective for automotive vehicles which are somewhat heavier at the rear than the front.

What is claimed is:

1. An air suspension system for a vehicle suspension between unsprung and sprung chassis portions of the vehicle comprising a pair of transversely spaced expansible fluid reservoirs supporting forward sprung portions on said unsprung portions, a second pair of transversely spaced expansible fluid reservoirs supporting rearward sprung portions on said unsprung portions, a fluid pressure source, individual valve means for each of the reservoirs associated with said forward portions between said source and an associated reservoir, and valve actuating means for each of said individual valve means connected to its associated valve means and responsive to the distance between said unsprung portions and the associated forward sprung portion operable to actuate said valve means and connect said source to an associated reservoir, valve means for one of the reservoirs supporting said rearward sprung portions between said source and the associated reservoir, valve actuating means connected to said last mentioned valve means and responsive to the distance between said unsprung and rearward sprung portions operable to actuate the associated valve means to connect said source to said reservoir, and a communicating connection between the one of said reservoirs supporting rearward sprung portions and said other reservoir supporting rearward sprung portions, so that the latter is supplied with air through the former.

2. The suspension system of claim 1 which includes a restriction in said communicating connection for metering the flow of air between the expansible fluid reservoirs supporting rearward sprung portions on said unsprung portions.

3. The suspension of claim 2 which includes a metering restriction between said source and the reservoirs associated with said forward portions.

4. An air suspension regulating system for a vehicle suspension between sprung and unsprung chassis portions of the vehicle comprising an expansible air reservoir between said portions resiliently supporting one on the other, an air pressure source having a high pressure side and a low pressure side, communicating connections between the high pressure side of said source and reservoir including valve means and a metering orifice, a communicating connection between said reservoir and the low pressure side of said source including valve means and a metering orifice, the relative sizes of said orifices to each other being in inverse relation to the pressure differential between the high pressure side of said source and reservoir and said reservoir and the low pressure side of said source, and valve actuating means connected to said valve means and responsive to a distance between said portions greater than a predetermined distance therebetween to connect the high pressure side of said source to said reservoir via the first-mentioned of said orifices and responsive to a distance less than said predetermined distance to connect said reservoir to the low pressure side of said source via the second-mentioned of said orifices.

5. An air suspension regulating system for a vehicle suspension between unsprung and sprung chassis portions of the vehicle comprising an expansible air reservoir between said portions resiliently supporting one on the other, an air pressure source, valve means including an orifice between said source and reservoir, second valve means including an orifice between said reservoir and the atmosphere which is larger than said first mentioned orifice, the pressure difference between said air pressure source and said reservoir being greater than the pressure difference between said air reservoir and the atmosphere, and valve actuating means connected to said valve means and responsive to a distance greater than a predetermined distance between said portions to connect said pressure source to said reservoir via said first mentioned orifice and responsive to a distance less than said predetermined distance to connect said reservoir to the atmosphere via said second mentioned orifice.

References Cited in the file of this patent

UNITED STATES PATENTS

| | | |
|---|---|---|
| 1,179,015 | McCrosson | Apr. 11, 1916 |
| 1,244,752 | McCrosson | Oct. 30, 1917 |
| 1,371,648 | Schmidt | Mar. 15, 1921 |
| 1,464,680 | Lassen | Aug. 14, 1923 |
| 2,653,021 | Levy | Sept. 22, 1953 |
| 2,848,249 | Bertsch | Aug. 19, 1958 |